United States Patent
Priepke

(10) Patent No.: US 7,520,118 B1
(45) Date of Patent: *Apr. 21, 2009

(54) HEADER WITH HIGH SPEED SICKLE DRIVES FOR A PLANT CUTTING MACHINE

(75) Inventor: Edward H. Priepke, Lancaster, PA (US)

(73) Assignee: CNH America LLC, New Holland, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/977,207

(22) Filed: Oct. 24, 2007

(51) Int. Cl.
*A01D 34/02* (2006.01)
*A01D 34/30* (2006.01)

(52) U.S. Cl. ...................................................... 56/257
(58) Field of Classification Search ................. 56/257, 56/296, 293, 299, 297, 246, 260
See application file for complete search history.

(56) References Cited

U.S. PATENT DOCUMENTS

| 357,330 | A | | 2/1887 | Nieth et al. |
| 1,980,527 | A | | 11/1934 | Hewton .......................... 74/55 |
| 2,569,507 | A | | 10/1951 | von Schlegell ............... 60/54.5 |
| 3,538,690 | A | | 11/1970 | Hinks .......................... 56/26.5 |
| 3,657,868 | A | * | 4/1972 | Cousino ...................... 56/13.6 |
| 3,701,238 | A | | 10/1972 | Hintze, Jr. ..................... 56/10.4 |
| 3,937,089 | A | | 2/1976 | Gartner .......................... 74/25 |
| 3,973,378 | A | * | 8/1976 | Bartasevich et al. .......... 56/11.9 |
| 4,222,619 | A | | 9/1980 | Nilsson ....................... 308/176 |
| 4,838,014 | A | | 6/1989 | Koch et al. .................... 56/13.6 |
| 4,838,114 | A | | 6/1989 | Stidworthy ............... 74/568 R |
| 4,866,921 | A | | 9/1989 | Nagashima et al. ........... 56/257 |
| 4,909,025 | A | * | 3/1990 | Reissig et al. ................. 56/257 |
| 6,314,707 | B1 | * | 11/2001 | Ryan ........................... 56/246 |
| 6,698,177 | B1 | | 3/2004 | Akchi et al. .................. 56/236 |
| 6,796,204 | B2 | | 9/2004 | Verhulst et al. ............... 74/640 |
| 6,889,492 | B1 | | 5/2005 | Polk et al. ..................... 56/257 |
| 7,121,074 | B1 | * | 10/2006 | Regier et al. .................. 56/296 |
| 7,313,903 | B2 | * | 1/2008 | Schumacher et al. .......... 56/304 |
| 7,401,458 | B2 | * | 7/2008 | Priepke ....................... 56/296 |

FOREIGN PATENT DOCUMENTS

CH 671136 8/1989

* cited by examiner

*Primary Examiner*—Árpád Fábián-Kovács
(74) *Attorney, Agent, or Firm*—Michael C. Harms; John William Stader; Patrick M. Sheldrake

(57) ABSTRACT

A header for a plant cutting machine uses a plurality of compact sickle drive mechanisms incorporated into or beneath a floor or pan of the header at a location between and spaced from the sides or ends of the header, each of which mechanisms can be configured for reciprocatingly driving two knife assemblies disposed in end to end relation, in opposite directions, such that potentially vibratory forces, including those generated by the moving masses of the knife assemblies, at least substantially cancel one another and thus are not transferred to structure of the header. As a result, the knife assemblies can each be relatively short, to lessen the mass thereof so as to be capable of being operated at higher speeds, to enable operation of the header at faster ground speeds.

22 Claims, 16 Drawing Sheets

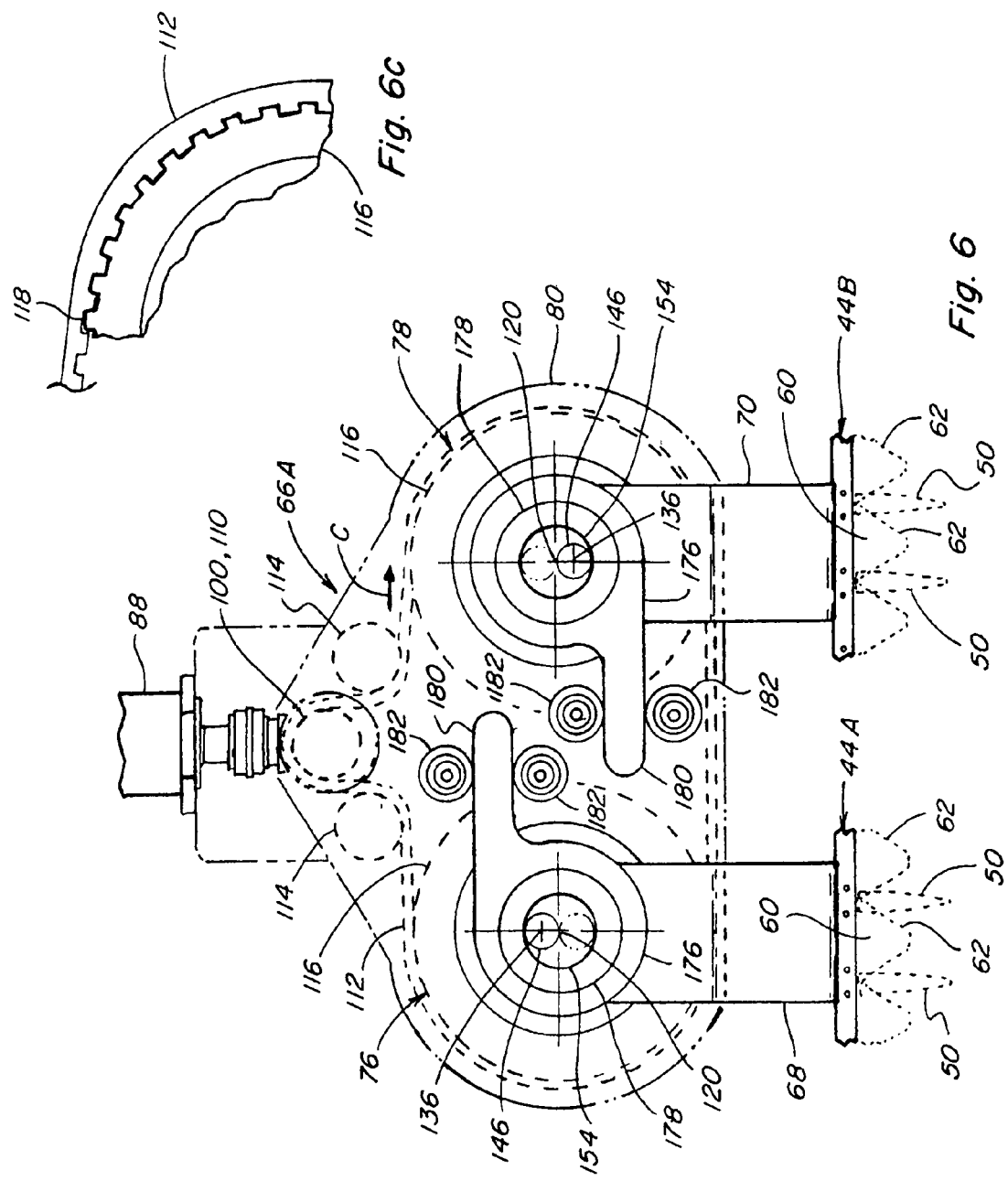

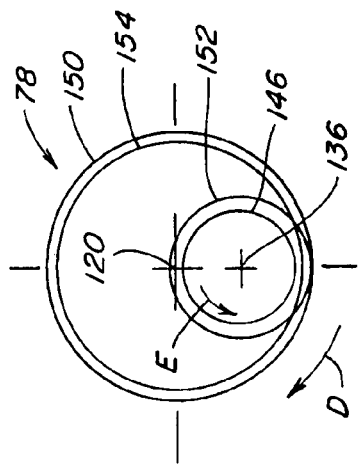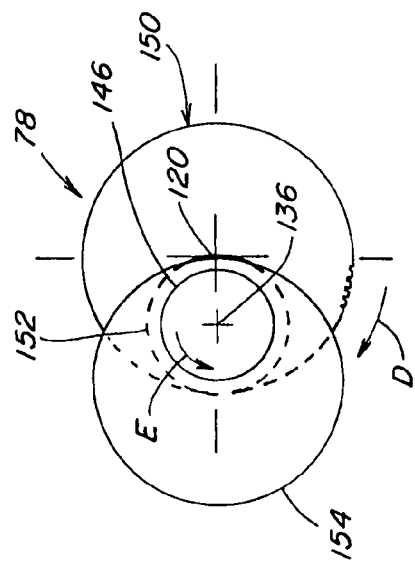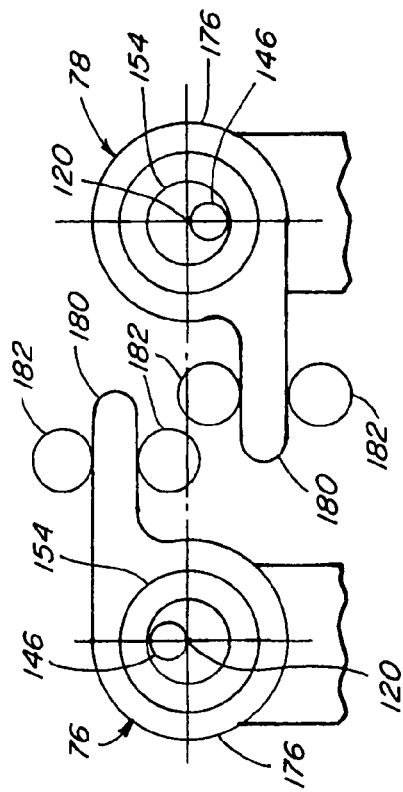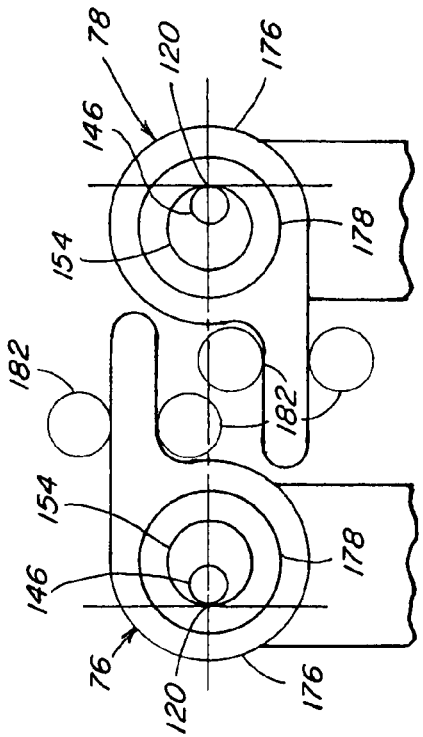

HEADER WITH HIGH SPEED SICKLE DRIVES FOR A PLANT CUTTING MACHINE

TECHNICAL FIELD

This invention relates generally to a header for a plant cutting machine such as a combine or a windrower, and more particularly, to a header including a plurality of compact epicyclic drive mechanisms disposed at locations along the width thereof and connected in driving relation to knife assemblies of a sickle of the header, the drive mechanisms being adapted for high speed operation, for enabling operation of the header at high ground speed.

BACKGROUND ART

Agricultural combines have increased in capacity to harvest large quantities of crop material to such a degree that it is becoming desirable to have the capability to increase the ground speed of the combine to match header productivity with the increased combine capacity. Generally, the maximum ground speed of a header is considered to be the greatest speed at which the cutting sickle of the header will not strip and leave crop on the field. This, in turn, is a function of the speed of reciprocating movement of the knife assembly or assemblies of the sickle, which is typically expressed in terms of strokes per minute of the knife assemblies. Generally in this regard, the more strokes per minute of the knife assembly of a sickle, the greater its crop cutting capacity, and thus the greater ground speed achievable using that sickle. However, the maximum achievable strokes per minute of a sickle has been found to be a function of the mass of the knife assembly being moved in the reciprocating manner. Presently, for grain headers having a width of about 40 feet, the sickle will include two knife assemblies having a width of about 20 feet each. For a header of 30 feet, two knife assemblies of about 15 feet each will typically be used. These knife assemblies are typically operated at maximum speeds of up to about 1300 strokes per minute. This translates to a maximum ground speed of about 7 miles per hour without stripping.

In contrast to the above-discussed sickles of grain headers, sickles of some known windrowers can be operated at maximum speeds of up to about 2000 strokes per minute. This provides a correspondingly higher ground speed capability, of approximately 11 miles per hour. However, the knife assemblies of these sickles are relatively short, having maximum widths of only about 9 feet. A windrow sickle utilizing dual knife assembly drives will be twice this length. As a result, these knife assemblies have a mass that is only a fraction of that of a knife assembly of a 30 foot wide grain header, and even less than that of a 40 foot wide header, hence the greater maximum speed achievable.

Presently, the knife assemblies of the known large headers of plant cutting machines are driven from the side or end of the header by an oscillating drive, which can include, but is not limited to, an eccentric shaft on a rotating hub, a wobble drive, or a similar well known commercially available device. This location is advantageous, as it does not obstruct or interfere with flow of cut crop material into the header. However, it also a disadvantage for wider headers, as it requires the knife assemblies to have a length of at least one half the width of the header, and thus a greater mass, which in turn, requires a lower operating speed.

Thus, what is sought is a header of an agricultural cutting machine, such as a combine or windrower, and particularly a wide header 30 feet or more wide, which has a sickle operable at a higher cutting speed of at least about 1600 strokes per minute, to allow harvesting at higher ground speeds, and which overcomes one or more of the shortcomings and disadvantages referenced above.

SUMMARY OF THE INVENTION

What is disclosed is a header of an agricultural cutting machine, such as a combine or windrower, and particularly a wide header 30 feet or more wide, which has a sickle operable at a higher cutting speed of at least about 1600 strokes per minute, to allow harvesting at higher ground speeds, and which overcomes one or more of the shortcomings and disadvantages referenced above.

According to a preferred aspect of the invention, the header includes an elongate structure having a first end portion, a second end portion opposite the first end portion, an elongate forward edge portion extending between the first and second end portions, and an at least generally upwardly facing floor extending along the elongate forward edge portion between the first and second end portions. The header includes an elongate first knife assembly supported by the structure adjacent to a first portion of the forward edge portion thereof for longitudinal movement therealong, and an elongate second knife assembly supported by the structure adjacent to a second portion of the forward edge portion thereof for longitudinal movement therealong in generally end to end relation to the first knife assembly. A first sickle drive mechanism is also supported on the structure and includes a first epicyclic drive connected in driving relation to the first knife assembly and operable for reciprocatingly moving the first knife assembly relative to and along the first forward edge portion of the structure, and a second epicyclic drive connected in driving relation to the second knife assembly and operable for reciprocatingly moving the second knife assembly relative to and along the second forward edge portion of the structure. The first sickle drive mechanism is preferably disposed at least partially beneath a portion of the floor spaced from the first and second and portions of the structure, such that cut crop material will flow easily, and uninterrupted thereover.

The header additionally preferably includes an elongate third knife assembly supported by the structure adjacent to a third portion of the forward edge portion thereof for longitudinal movement therealong, and an elongate fourth knife assembly supported by the structure adjacent to a fourth portion of the forward edge portion thereof for longitudinal movement therealong in generally end to end relation to the third knife assembly. A second sickle drive mechanism supported on the structure includes a third epicyclic drive connected in driving relation to the third knife assembly and is operable for reciprocatingly moving the third knife assembly relative to and along the third forward edge portion of the structure, and a fourth epicyclic drive is connected in driving relation to the fourth knife assembly and is operable for reciprocatingly moving the fourth knife assembly relative to and along the fourth forward edge portion of the structure, the second sickle drive mechanism also preferably being disposed at least partially beneath a portion of the floor spaced from the first and second and portions of the structure.

According to another preferred aspect of the invention, the knife assemblies are each from about 7 feet to about 12 feet in width. And, according to another preferred aspect, each of the epicyclic drives is operable for reciprocatingly moving the knife assembly connected thereto at a speed of at least about 1600 strokes per minute, and more preferably within a range of from about 1600 to about 2000 strokes per minute. As a result, greater ground speeds can be achieved.

According to still another preferred aspect of the invention, the two epicyclic drives of each sickle drive mechanism are mounted in side by side relation, and are connected in timed reciprocatingly driving relation to the two knife assemblies, respectively, for simultaneously moving the knife assemblies reciprocatingly in opposite sideward directions. The timing causes the elements of the respective drives to eccentrically rotate in timed relation, such that radial forces generated by imbalances of the respective elements are at least substantially cancelled, resulting in the net overall forces and vibrations emanating from the two drives and knife assemblies being greatly reduced or even substantially eliminated.

According to a still further preferred aspect of the invention, each sickle drive mechanism is configured such that the two epicyclic drives are jointly driven by a common drive, preferably in timed relation one to the other using a timing belt drive, chain drive and/or gear drive. The common drive can be a motor, such as a fluid or electric motor, a PTO shaft, or the like.

As examples according to the invention, for wider headers, for instance, having a width of from about 36 to about 40 feet, it is contemplated that the two knife assemblies driven by each sickle drive mechanism will extend about one half the width of the header. And, still further, it is contemplated according to the invention, that a header could include additional knife assemblies and sickle drive mechanisms, either to accommodate a greater header width, or to allow use of shorter knife assemblies for achieving greater cutting speeds.

BRIEF DESCRIPTION OF THE DRAWINGS

FIG. 6 is a top view of the drive mechanism of FIG. 2, illustrating elements thereof in a first representative operating position;

FIG. 6a is a simplified schematic top view of the drive mechanism of FIG. 2 in the operating position of FIG. 6;

FIG. 6b is a simplified schematic top view of a pinion gear and ring gear and an eccentric element of the drive mechanism of FIG. 2 for the operating position of FIG. 6;

FIG. 6c is a fragmentary top view of the drive mechanism of FIG. 6, illustrating a timing drive belt;

FIG. 7a is a simplified schematic top view of the drive mechanism of FIG. 7;

FIG. 7b is a simplified schematic top view of the pinion gear and ring gear and eccentric element of the drive mechanism of FIG. 7;

DETAILED DESCRIPTION OF THE INVENTION

Figure 1:
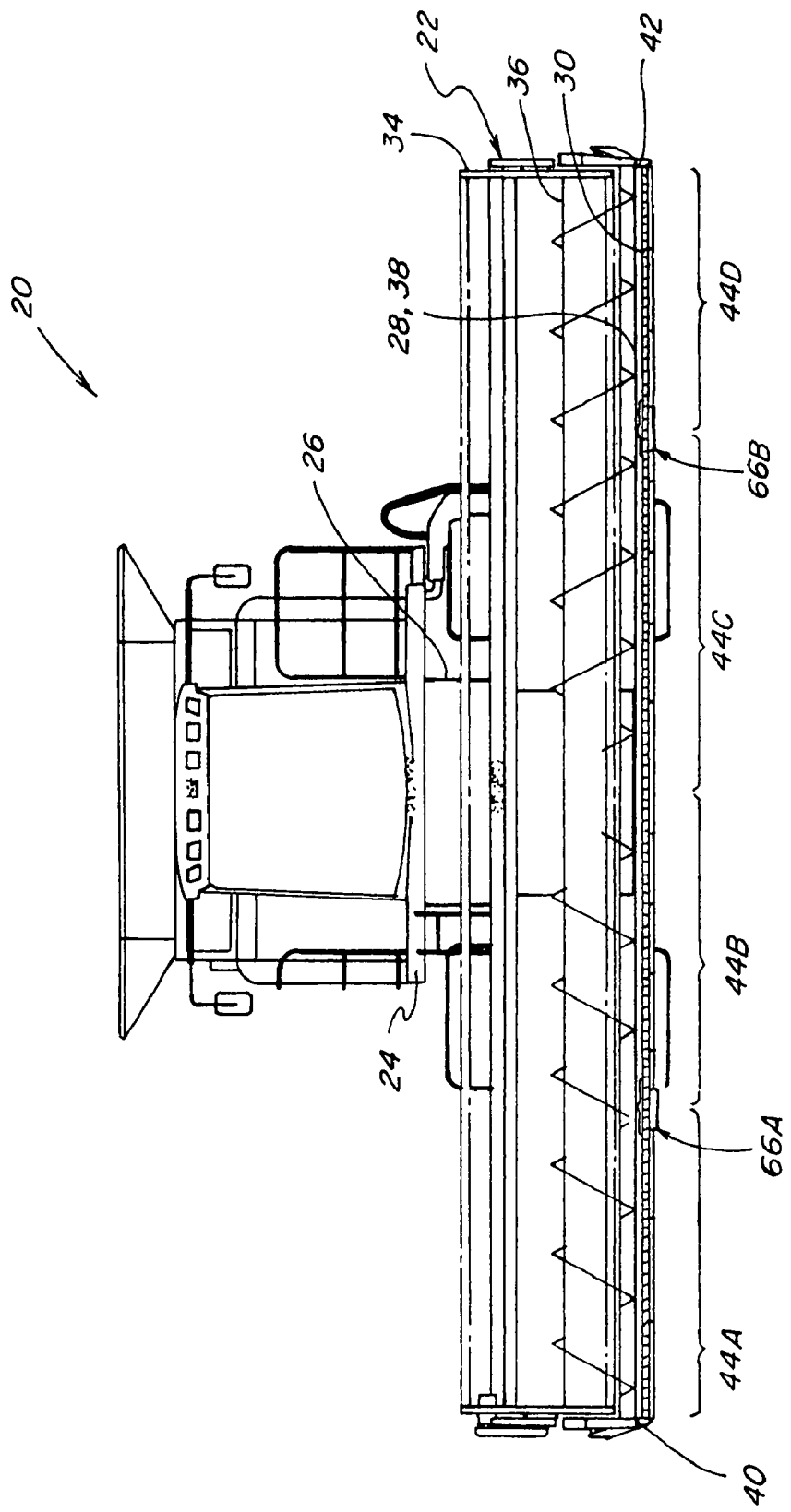
FIG. 1 is a forward end view of a combine including a header having sickle drive mechanisms according to the present invention.

Turning now to the drawings wherein a preferred embodiment of the invention are shown, in FIG. 1, a conventional, well known agricultural cutting machine, which is a combine 20, is shown including a header 22. Header 22 is shown supported in the conventional, well-known manner on a forward end 24 of combine 20, and is operable for cutting or severing crops such as, but not limited to, small grains such as wheat and soybeans, and inducting the severed crops into a feeder 26 for conveyance into combine 20 for threshing and cleaning, in the well known manner, as combine 20 moves forwardly over a field.

Figure 2:
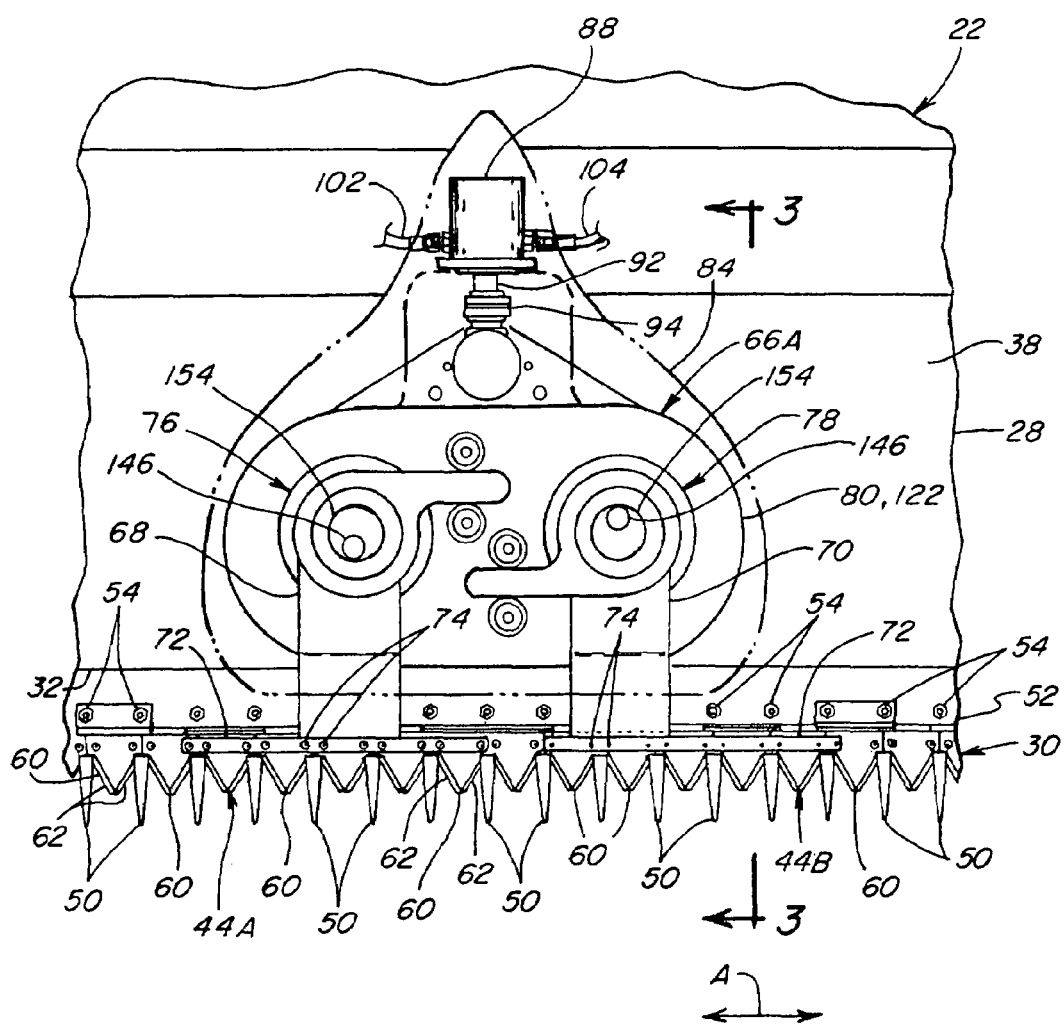
FIG. 2 is an enlarged fragmentary top view of the header of FIG. 1, with a cover and an upper bearing assembly of a sickle drive mechanism removed to show internal aspects thereof.
Figure 3:
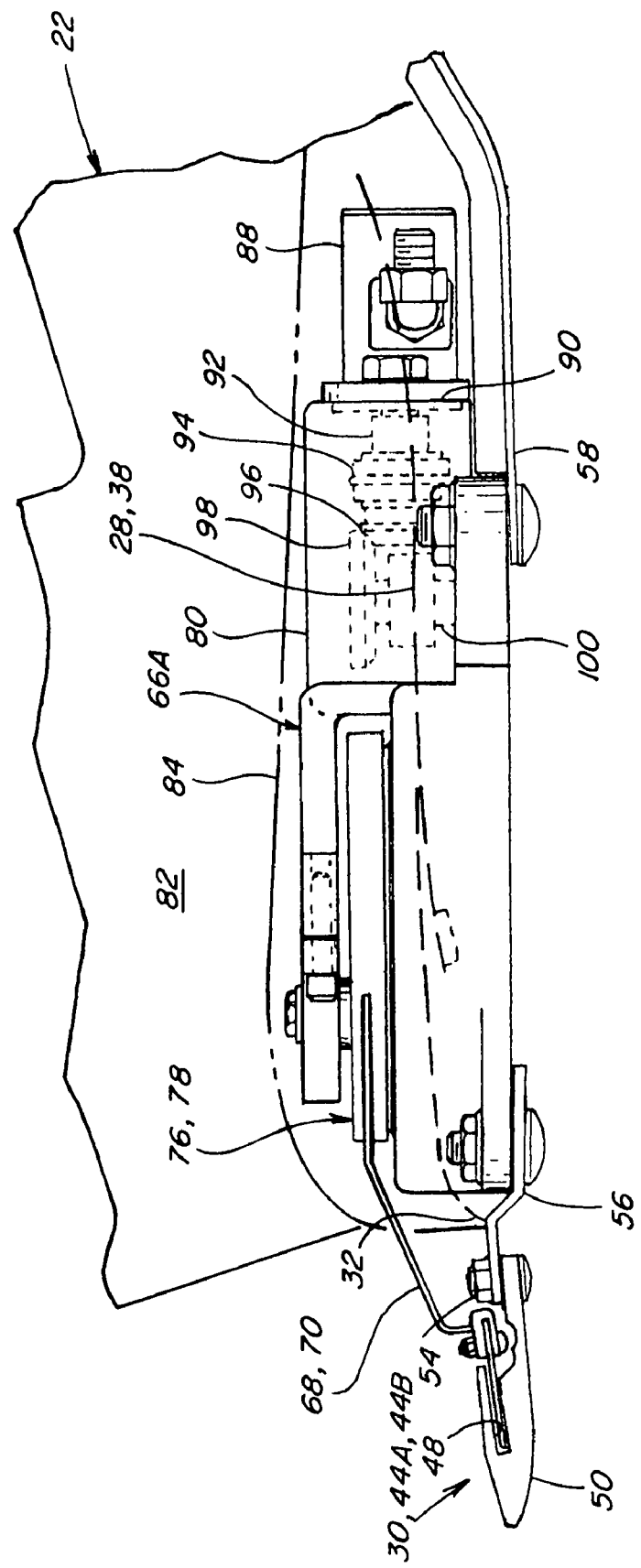
FIG. 3 is an enlarged fragmentary sectional view of the header taken generally along line 3-3 of FIG. 2, and with the cover and a floor of the header in phantom to reveal the drive mechanism.

Referring also to FIGS. 2 and 3, header 22 includes a pan or floor 28 which is supported in desired proximity to the surface of the field during the harvesting operation, and an elongate, sidewardly extending sickle 30 along a forward edge portion 32 of floor 28, sickle 30 being operable for severing the crop for induction into header 22, as will be explained. Header 22 additionally includes an elongate, sidewardly extending reel 34 (FIG. 1) disposed above sickle 30 and rotatable in a direction for facilitating induction of the severed crops into header 22. An elongate, rotatable auger 36 (shown in outline form in FIG. 1) that extends in close proximity to a top surface 38 of floor 28 and has helical flights therearound (not illustrated) is operable in cooperation with reel 34 for conveying the severed crops toward an inlet opening of feeder 26 for induction into combine 20, in the well-known manner.

Referring more particularly to FIG. 1, sickle 30 extends in a sideward direction along the width of floor 28, between a first side edge portion 40 of the floor, and an opposite second side edge portion 42. Sickle 30 includes an end to end line of elongate, sidewardly extending line of cutter bar assemblies, including a first cutter bar assembly 44A, a second cutter bar assembly 44B, a third cutter bar assembly 44C, and a fourth cutter bar assembly 44D, extending in end to end longitudinally aligned relation adjacent to forward edge portion 32 of floor 28.

Referring more particularly to FIGS. 2 and 3, cutter bar assemblies 44A, 44B, 44C and 44D, are essentially of identical construction and operation, and each includes a plurality of sidewardly facing aligned slots 48 through a sidewardly extending array of guards 50 which project forwardly from a stationary bar 52 at sidewardly spaced intervals therealong. Stationary bar 52 extends the length of sickle 30 just forwardly of forward edge portion 32 of floor 28, and guards 50 are mounted to bar 52 with fasteners 54. Bar 52, in turn, is mounted to a frame 58 at the bottom of header 22, as also illustrated in FIG. 3. Each of cutter bar assemblies 44A, 44B, 44C, and 44D supports an elongate knife assembly 60 for reciprocating longitudinal movement within slots 48, knife assemblies 60 also being essentially of identical construction. Each knife assembly 60 includes a row of knife sections including oppositely facing, angularly related knife edges 62 which, in conjunction with adjacent guards 50, effects a shearing or cutting action which severs plant stems and stalks or other material captured between the knives and the guards as the knife sections are reciprocatingly moved sidewardly, as denoted by arrows A.

A first compact sickle drive mechanism 66A constructed and operable according to the teachings of the present invention, is connected in driving relation to first and second cutter bar assemblies 44A and 44B, and a second compact sickle drive mechanism 66B is connected in driving relation to third and fourth cutter bar assemblies 44C and 44D. Sickle drive mechanisms 66A and 66B are also identical in construction. Sickle drive mechanism 66A is illustrated in FIG. 1 at a location on header 22 between first and second cutter bar assemblies 44A and 44B, and sickle drive mechanism 66B is illustrated at a location between third and fourth cutter bar assemblies 44A and 44B, although it should be noted that it is contemplated that sickle drive mechanisms 66A and 66B could alternatively be utilized at other locations on a header such as header 22, and that additional sickle drives could be used on a header, as desired or required according to the present invention.

Figure 3A:
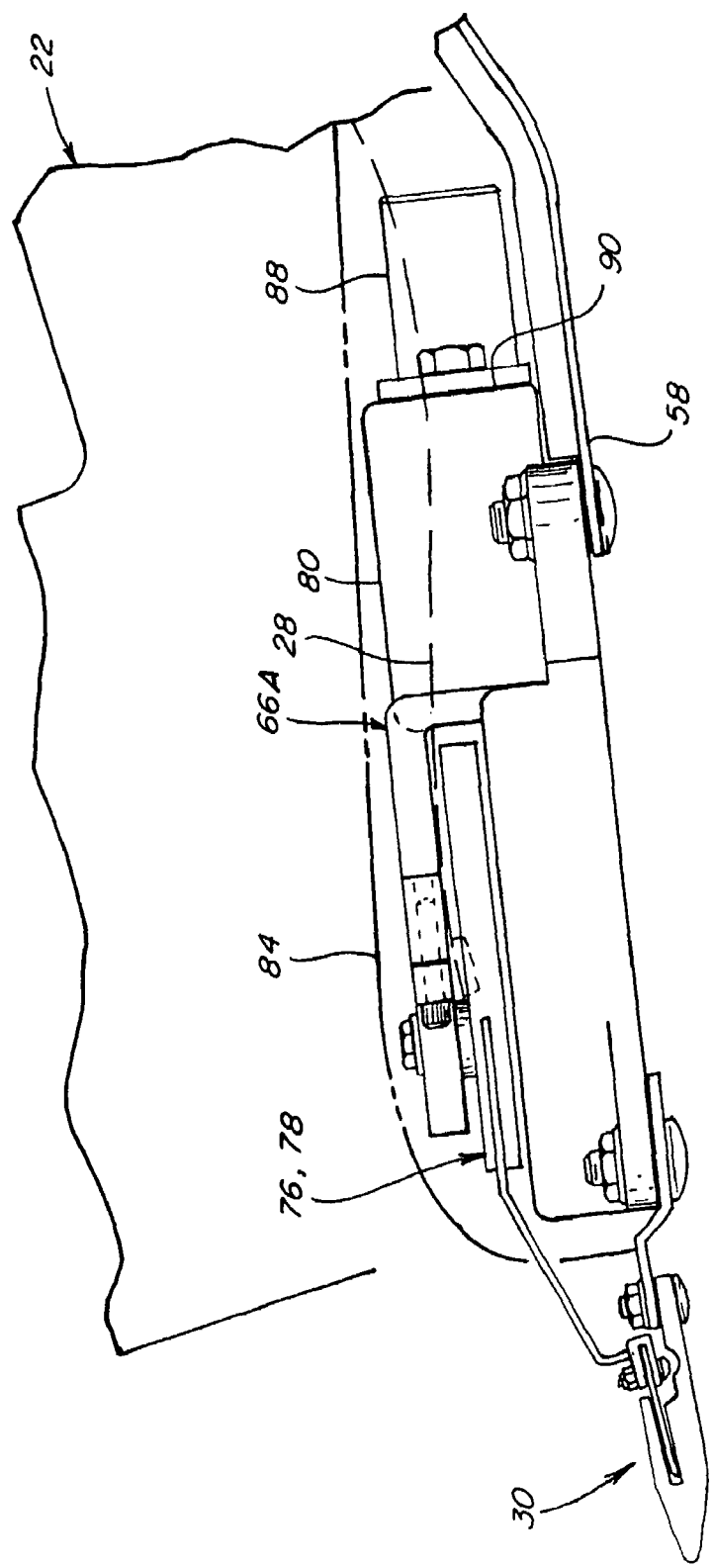
FIG. 3a is another enlarged fragmentary sectional view of the header taken generally along line 3-3 of FIG. 2, with the sickle and drive mechanism moved vertically relative to the floor of the header to illustrate utility of the invention for headers having a floating capability.
Figure 4:
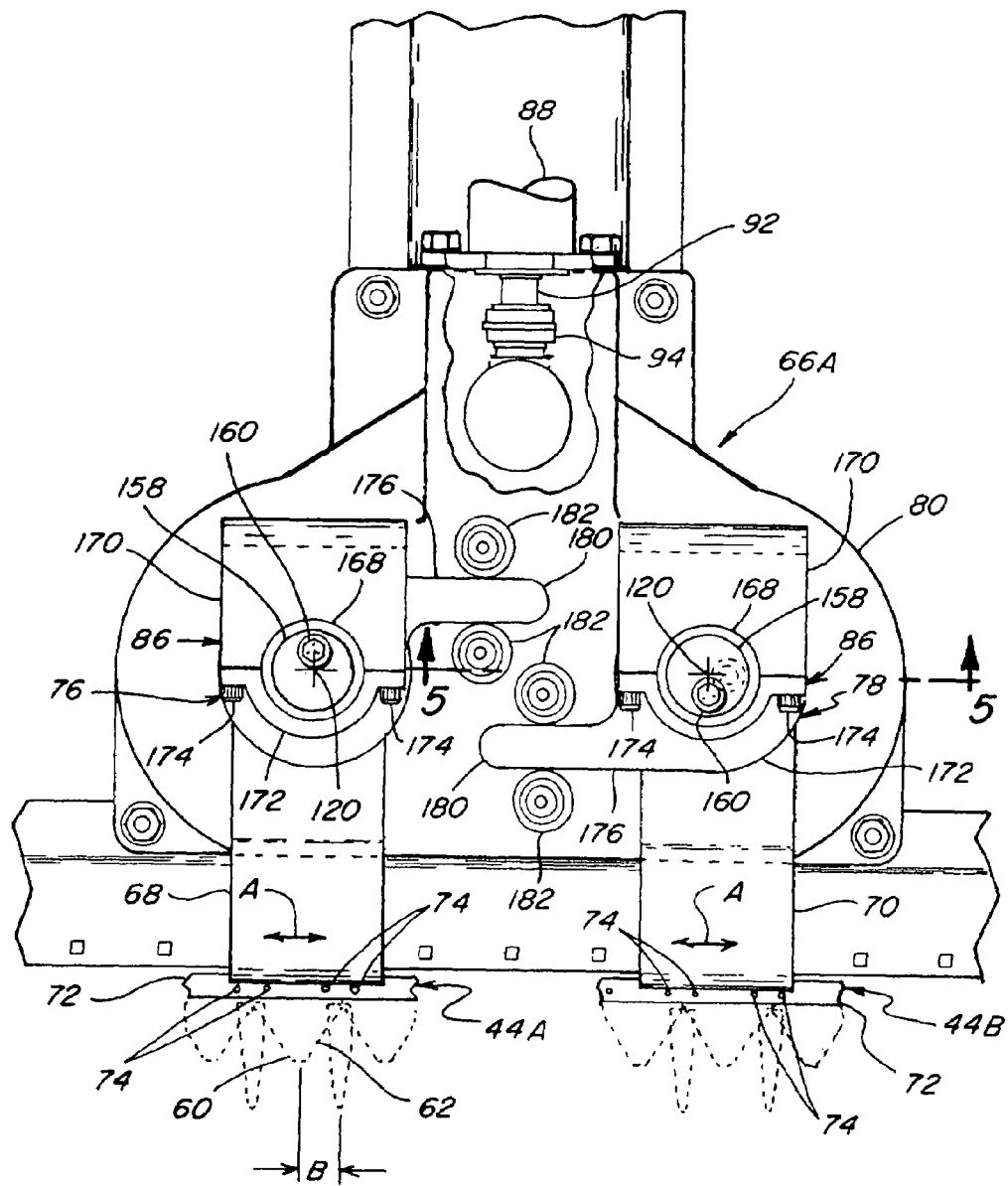
FIG. 4 is a top view of the drive mechanism of FIG. 2, showing the upper bearing assemblies in place.

Referring also to FIGS. 3, 3a and 4, sickle drive mechanism 66A and 66B are identical in construction and operation, and thus the following discussion directed to mechanism 66A will be deemed to also apply to mechanism 66B. Mechanism 66A includes a first knife head driver element 68 in connection with the knife assembly 60 of first cutter bar assembly 44A, and a second knife head driver element 70 in connection with the knife assembly 60 of second cutter bar assembly 44B, knife head driver elements 68 and 70 being simultaneously operable by drive mechanism 66A for reciprocatingly driving the knife head assemblies 60 of respective cutter bar assemblies 44A and 44B sidewardly, as illustrated by arrows A, in timed relation so as to move in opposite sideward directions. That is, as knife head assembly 60 of first cutter bar assembly 44A is moved in one sideward direction, knife head assembly 60 of second cutter bar assembly 44B will be moved in the opposite sideward direction. The length of the sideward movements, or strokes, will be sufficient for providing the desired cutting action, which will typically be equal to about the sideward extent of a knife edge 62 of a typical knife section, as generally denoted by distance B in FIG. 4. First and second knife head driver elements 68 and 70 are preferably constructed of a sheet or cast metal bent or formed to a sectional shape about as shown, and are connected to knife assemblies 60 of the respective cutter bar assemblies 44A and 44B in a suitable manner, here using sidewardly extending elongate bars 72 on the forward ends of driver elements 68 and 70, which connect to the knife assemblies 60 with suitable fasteners such as screws 74 or the like. Here, it should be noted that it is desired for the knife head assemblies 60 to move only in the sideward directions relative to stationary bar 52, and not forwardly, rearwardly, upwardly or downwardly to any significant extent relative thereto. This is achieved at least in large part by the containment of knife head assemblies 60 in slots 48 of stationary bar 52, although other constructions for holding the knife head assemblies could be used. Because driver elements 68 and 70 are rigidly connected with knife head assemblies 60, respectively, driver elements 68 and 70 are also restricted to sideward movements only.

Drive mechanism 66A includes a first epicyclic drive 76 connected in driving relation to first knife head driver element 68, and a second epicyclic drive 78 connected in driving relation to second knife head driver element 70, epicyclic drives 76 and 78 being contained in a compact common housing 80 of drive mechanism 66A mounted, for instance, on frame 58 of header 22. It is contemplated and preferred that compact sickle drive mechanism 66A, and mechanism 66B also, be incorporated in or beneath floor 28 of header 22, sufficiently such that cut plant material, particularly crops, cut by those portions of cutter bar assemblies 44A and 44B forwardly of drive mechanism 66A will be able to relatively smoothly and uninterruptedly flow over and around drive mechanism 66A so as to enter a plant or crop flow area 82 above floor 28, and so as to subsequently be conveyed, for instance, by reel 34 and auger 36, to the inlet of feeder 26 of combine 20. To facilitate this, drive mechanism 66A is vertically compact, preferably having a vertical extent of no more than about six inches, and is preferably disposed beneath and covered by a smooth, low profile, streamlined upper cover 84 which preferably is of sheet metal or similar construction and forms a part of floor 28 and top surface 38 thereof at the center of header 22. Cover 84 preferably has a forwardly facing slot or slots through which driver elements 68 and 70 extend, but which slots are sufficiently narrow to as to at least substantially prevent passage of cut plant material through the slot or slots and into the interior of cover 84. Here, it should be noted that epicyclic drives 76 and 78 each preferably includes an upper bearing assembly 86 (deleted in FIG. 2 to reveal other aspects of the drives), which is illustrated in FIGS. 3, 3a and 4 as being external to housing 80, but which, alternatively, could be incorporated within the housing 80. The bottom region of housing 80 is also preferably enclosed, to prevent entry of contaminants into the interior thereof.

In FIG. 3a, frame 58, sickle 30, drive mechanism 66A and cover 84 are shown in a lowered position relative to floor 28, for facilitating a floating sickle capability, and illustrates the adaptability of drive mechanism 66A for use with a header such as header 22 having this capability. Here, it is contemplated that this feature would have utility for use when harvesting grains, such as soybeans, wherein a floating capability is typically used. Alternatively, frame 58, sickle 30 and drive mechanism 66A can be fixed and locked in a raised position, as illustrated in FIG. 3, as would typically be used for harvesting wheat. Additionally, the apparatus of the invention can be configured for use with flexible sickles or cutter bars assemblies, for instance, by allowing some sideward twisting or rotation of the structure such as frame 58 supporting mechanism 66A. And, the apparatus of the invention can be configured for use with variable floor headers wherein the cutter bar assembly and possibly a leading edge of the floor is fore and aft movable relative to the more rearward region of the floor.

Knife assemblies 60 are preferably reciprocatingly driven in timed relation by the respective epicyclic drives 76 and 78 so as to move in opposite sideward directions, such that forces generated by the moving masses of the knife assemblies are at least substantially contained within the structure of the invention, thereby substantially reducing or eliminating transfer of vibrations to the structure of header 22, and, from there to combine 20. Preferably, a common power source is used, which can be, but is not limited to, a fluid motor 88. Fluid motor 88 is illustrated as being mounted to a rear end 90 of housing 80. Fluid motor 88 is connected in rotatably driving relation to a horizontal rotatable input shaft 92 supported by a bearing 94 mounted within housing 80, and in connection with a bevel gear 96 enmeshed at a right angle with a second bevel gear 98. Second bevel gear 98, in turn, is mounted in connection with a vertical input shaft 100 mounted within housing 80. Fluid motor 88 is connected to a source of pressurized fluid and a fluid reservoir (not shown) on combine 20 in the conventional, well-known manner, via fluid lines 102 and 104 (FIG. 2) and is operable for rotating input shaft 92, which in turn rotates bevel gears 96 and 98 to rotate shaft 100. This provides the power to first and second epicyclic drives 76 and 78, which are configured to translate the power into the sideward reciprocating movements of first and second knife head driver elements 68 and 70, and thus of knife assemblies 60, as will be explained.

Figure 4A:
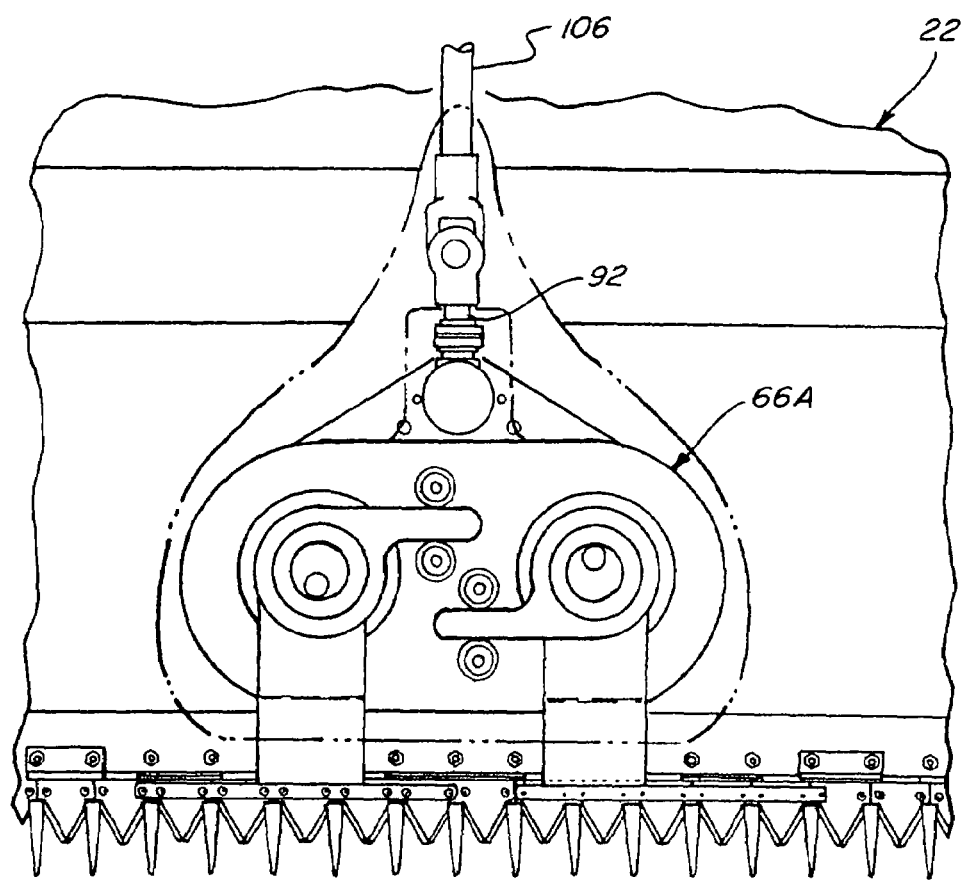
FIG. 4a is a top fragmentary view of the header and drive mechanism of FIG. 2, illustrating connection of the drive mechanism with an alternative power source which is a PTO shaft.
Figure 4B:
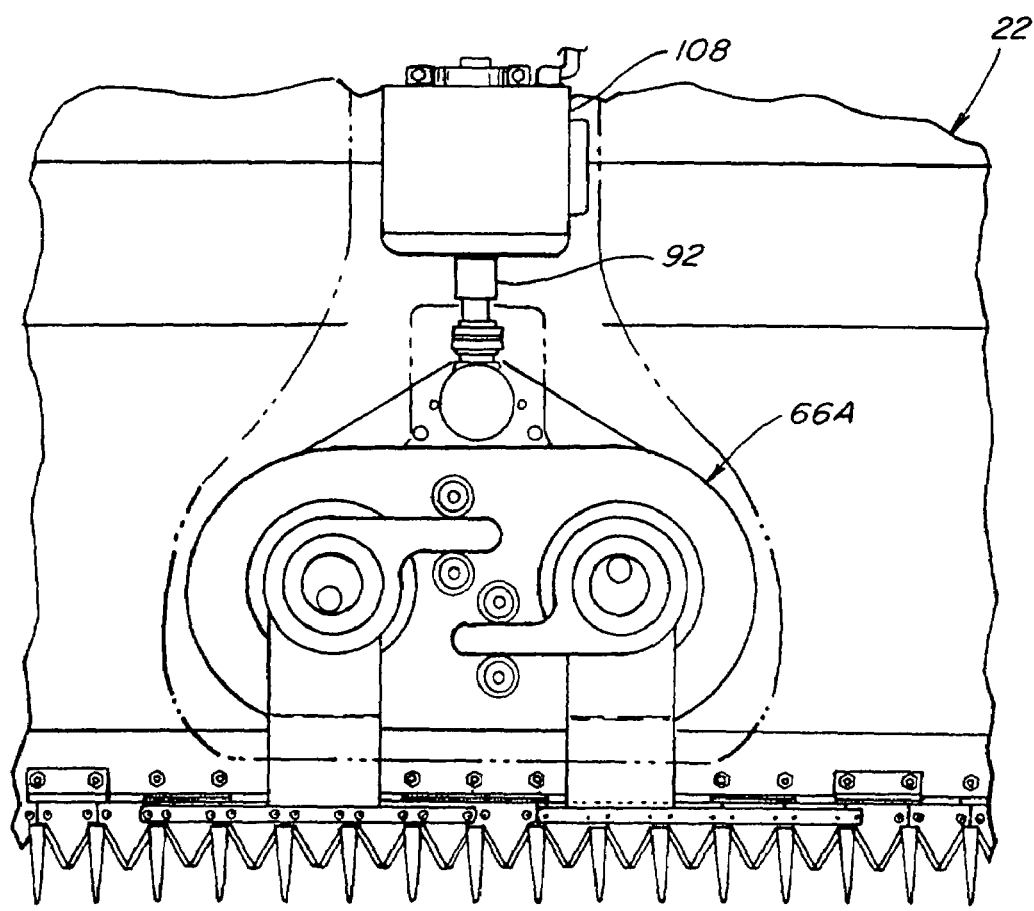
FIG. 4b is another top fragmentary view of the header and drive mechanism of FIG. 2, illustrating connection of the drive mechanism with another alternative power source which is an electric motor.

Referring also to FIGS. 4a and 4b, as noted above, drive mechanism 66A can be driven by an alternative power source, which can include, but is not limited to, a PTO shaft 106 (FIG. 4a), or an electric motor 108 (FIG. 4b), or other common driver such as a belt or chain (not shown) or a combination of such drives. In either of the illustrated instances, the alternative power source 106 or 108 can be connected in rotatably driving relation to drive mechanism 66A via an input shaft 92 or other suitable manner of connection. Here, it should be noted that the right angle drive capability provided by bevel gears 96 and 98 facilitates vertical compaction of drive mechanism 66A. And, as an alternative, it should be noted that first and second epicyclic drives 76 and 78 could be driven separately.

Figure 5:
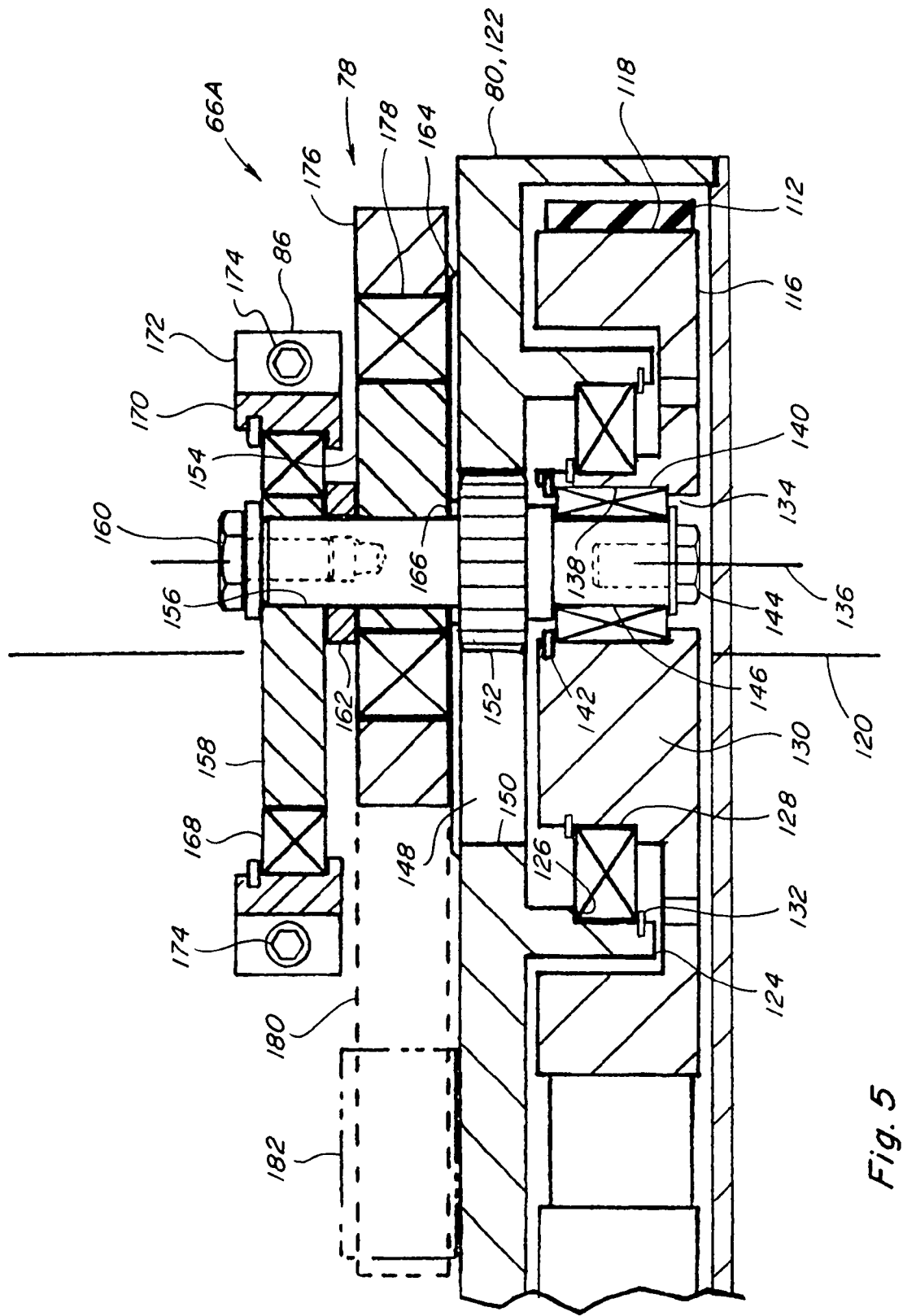
FIG. 5 is a fragmentary sectional view of a portion of the drive mechanism taken along line 5-5 of FIG. 4, illustrating internal aspects thereof.

Referring also to FIG. 5, a cross-sectional view of second epicyclic drive 78 illustrates the features thereof that enabled the vertical compactness of drive mechanism 66A. Referring also to FIG. 6, another top view of sickle drive mechanism 66A is shown, illustrating aspects of mechanism 66A for operating drives 76 and 78 in timed relation. More particularly in this latter regard, input shaft 100 includes a cog belt sheave 110 partially encircled by a cogged timing drive belt 112. A pair of idler wheels increase the wrap of belt 112 about sheave 110. Timing drive belt 112 is routed about the inner periphery of housing 80 to partially encircle an input element 116 of each of epicyclic drives 76 and 78. Here it should be noted that first and second epicyclic drives 76 and 78 share a common construction, but are timed differently such that, although rotated in the same direction by drive belt 112, first and second driver elements 68 and 70 will be simultaneously driven in opposite sideward directions, as will be explained. Input elements 116 of the respective drives 76 and 78 each comprise a flywheel having a cogged outer circumferential surface 118 engaged with cogged timing belt 112, as illustrated in FIG. 6c. Alternatively, a chain or gear drive, or a combination drive, could be used to accomplish a timed drive capability.

Input element 116 of each drive 76 and 78 is mounted for rotation about a central rotational axis 120 of the drive, on a fixed frame 122 of cast metal or other sturdy construction which is part of housing 80. This is achieved using a downwardly extending annular bearing flange 124 on frame 122, which defines a downwardly facing round cavity, and includes an inner circumferential bearing seat 126 into which a bearing 128 is suitably mounted and retained, for instance, using a snap ring 132. Input element 116 includes an inner hub 130 sized to be received in the downwardly open cavity and having an outer circumferential surface around which bearing 128 is retained, for instance, by a press fit, snap ring, or other suitable manner of mounting. Installation of ring 132 can be accomplished, for instance, using one or more holes that can be provided through input element 116, or in any other suitable manner. Hub 130 includes a hole 134 therein at a location offset from central rotational axis 120, and through which an eccentric axis 136, parallel to, but offset from rotational axis 120, extends. A bearing seat 138 extends around a portion of hole 134 and receives a bearing 140 which is suitably retained in position by a retainer ring 142, a press fit, or like.

The lower end of a pinion shaft 146 is received in pinion bearing 140 and secured thereto by a bolt 144 and a washer for rotation relative to input element 116, and extends upwardly through a central passage 148 extending through frame 122 and concentric about central rotational axis 120.

A ring gear 150 is fixedly mounted on or incorporated into frame 122 so as to extend around central passage 148. Pinion shaft 146 includes a pinion gear 152 enmeshed with ring gear 150, such that when input element 116 is rotated about central rotational axis 120, pinion gear 152 will cause pinion shaft 146 to rotate therewith about eccentric axis 136, while circling or orbiting about central rotational axis 120. Here, the internal pitch diameter of ring gear 150 is preferably selected to be equal to twice the pitch diameter of pinion gear 152, such that for each revolution of input element 116, pinion shaft 146 and pinion gear 152 about central rotational axis 120, pinion shaft 146 and gear 152 will be rotated two revolutions about eccentric axis 136.

Figure 5A:
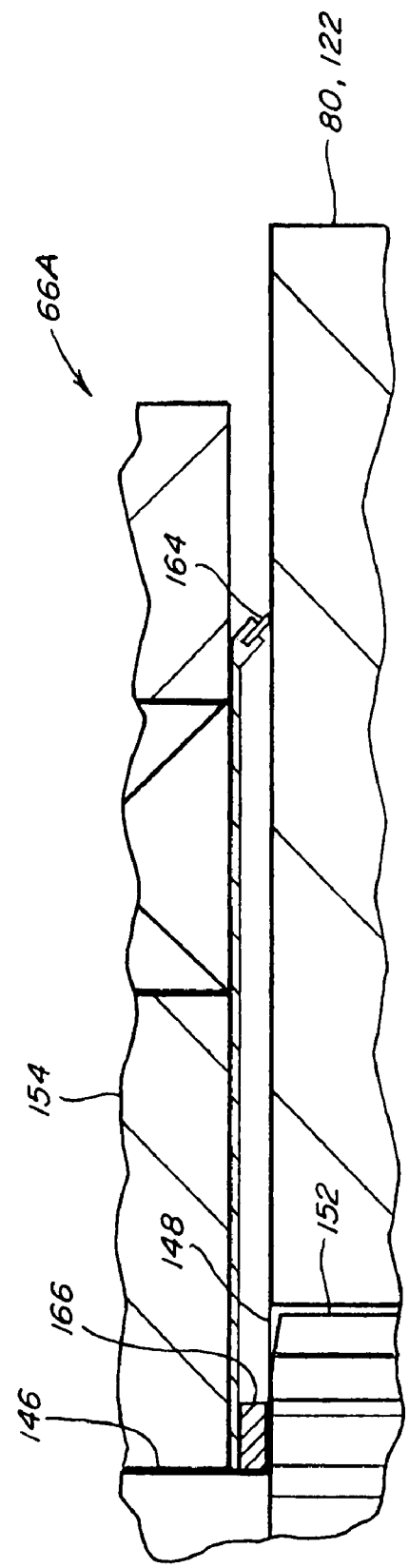
FIG. 5a is an enlarged fragmentary sectional view of a portion of the drive mechanism of FIG. 5, illustrating a dust cover thereof.

Pinion shaft 146 extends upwardly above frame 122 so as to be located above housing 80, and an eccentric element 154 is mounted to the upwardly extending pinion shaft 146, also above housing 80. These elements can be viewed from above when upper bearing assembly 86 is removed, as shown in FIGS. 2 and 6. Eccentric element 154 is a round or disc shaped member and is mounted to pinion shaft 146 so as to be eccentric to eccentric axis 136 therethrough. Pinion shaft 146 also preferably extends above eccentric element 154 so as to be received in a hole 156 in an upper bearing plate 158 of upper bearing assembly 86. A bolt 160 threadedly engaged with the upper end of pinion shaft 146 retains upper bearing plate 158 and eccentric element 154 on shaft 146. A splined, a tri-lobe type, or other suitable connection would be used to position and maintain position of elements 154 and 158 relative to each other and to the pinion. A spacer 162 is disposed around pinion shaft 146 between eccentric element 154 and upper bearing plate 158. Additionally, also referring to FIG. 5a, a seal 164 and a shoulder or a spacer 166 extend around pinion shaft 146 in a space between eccentric element 154 and an upper surface of frame 122 of housing 80. Seal 164 is preferably a lip type seal and covers central passage 148, to limit or prevent entry of water, dust and other contaminants into central passage 148.

Referring more particularly to FIGS. 4 and 5, circular or disc shaped upper bearing plate 158 is retained by a bearing 168 supported in a fixed bearing frame 170 of upper bearing assembly 86 attached to housing 80, such that bearing plate 158 is rotatable about central rotational axis 120 concentric with input element 116. Fixed bearing frame 170 illustrated is a split or saddle type bearing frame having a semicircular bearing cap 172 held in place on frame 170 by bolts or cap screws 174, for holding bearing 168 in axial alignment with central rotational axis 120, although other suitable bearing structures can also be used. Here, it should be noted that in the sectional view of FIG. 5 pinion shaft 146, pinion gear 152, upper bearing plate 158 and bolt 160 are illustrated in a rotational position about central rotational axis 120 (as illustrated by bolt 160 in dotted lines in FIG. 4) which is rotated 90° counterclockwise from that represented by bolt 160 in solid lines in FIG. 4, so as to better illustrate the offset, eccentric relationship of those elements with respect to central rotational axis 120.

Referring more particularly also to FIG. 6, eccentric element 154 of each epicyclic drive 76 and 78 is circular or disc shaped and supports a knife head assembly 176 on a bearing 178, such that eccentric element 154 and assembly 176 are relatively rotatable in a plane perpendicular to axes 120 and 136. Assembly 176 of each drive 76 and 78 is rigidly connected to respective knife head driver element 68 or 70 which extends forwardly therefrom to connect with the respective knife head 60. Assembly 176 includes an arm portion 180 extending sidewardly therefrom and between a pair of rollers 182 mounted externally on the top surface of housing 80. It should be observed that assemblies 176 are inverted mirror images of one another, such that arm portion 180 extend from opposite directions toward the center of drive mechanism 66A. This is important, as will be explained. Rollers 182, in cooperation with the containment of knife assemblies 60 in the slots of guards 50, restrain assembly 176, driver elements 68 and 70, and knife assemblies 60 from forward and rearward movement, but allow sideward movement thereof toward both ends or sides of the header, even through the full range of rotation of eccentric elements 154. Since knife assemblies 60 are located some distance forward of sickle drive 66A, and particularly of housing 80 and rotational axes 120, and are driven with considerable forces which can reach thousands of pounds, the forces from the acceleration and deceleration of knife assemblies 60 generate substantial force moments around axes 120. Such moments are restrained by arm portions 180 of knife head assemblies 176 through rollers 182 mounted to housing 80, keeping the forces contained within housing 80.

In FIG. 6, it should be noted that knife assemblies 60 are illustrated in a mid-stroke position wherein guards 50 are disposed about equidistant between knife edges 62 of adjacent knife sections. In this position, eccentric element 154 of both drives 76 and 78 are about concentric with the central rotational axis 120 of the respective drive. However, pinion shaft 146 of drive 76 is illustrated disposed above (actually rearwardly of) central rotational axis 120 of that drive, whereas pinion shaft 146 of drive 78 is illustrated disposed below (forwardly of) central rotational axis 120 of that drive. This is important, as the position of pinion shaft 146 about central rotational axis 120 of each drive 76 or 78 will establish the direction of sideward movement and position of the respective knife assembly 60 connected to that drive. For the examples, belt 112 will be assumed to move in the clockwise direction denoted by arrow C at the top of the drawing.

Figure 7:
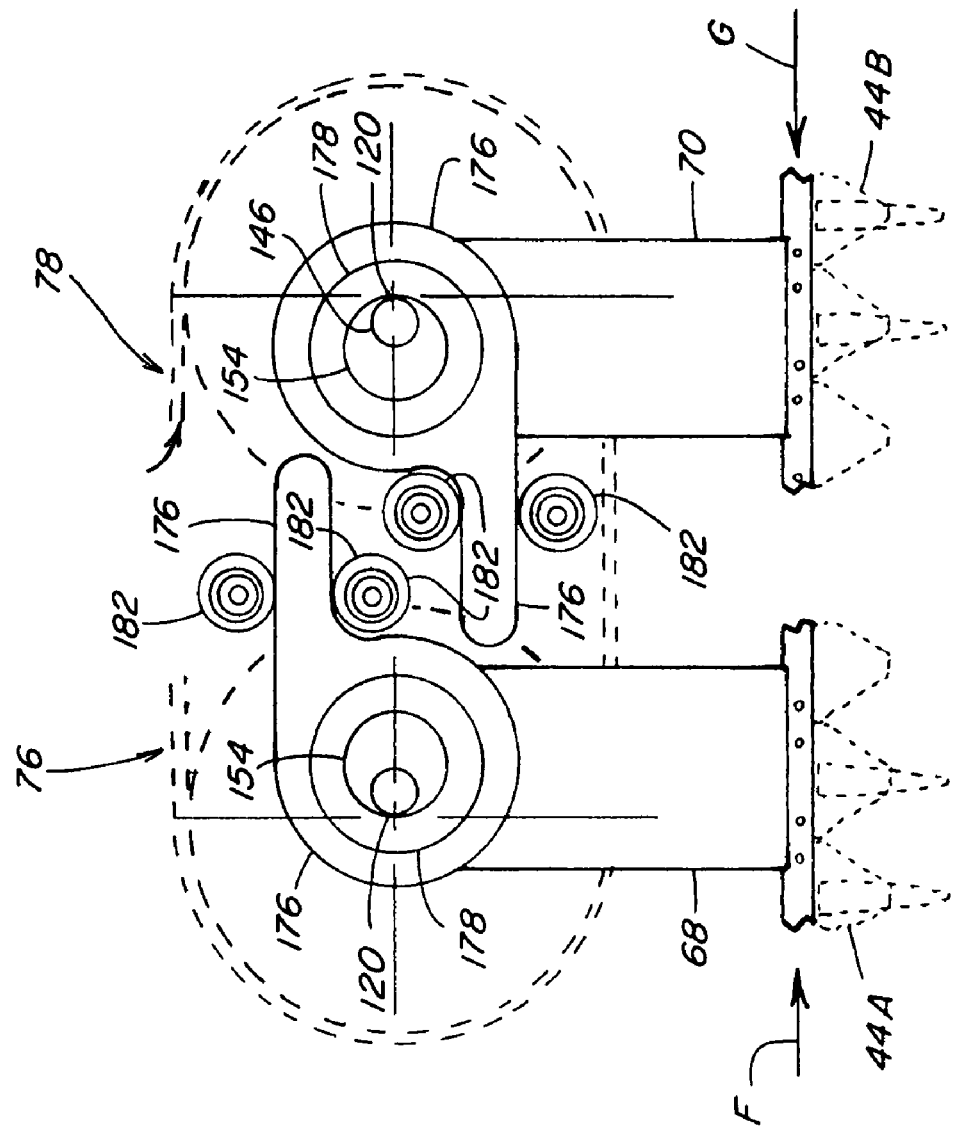
FIG. 7 is another top view of the drive mechanism of FIG. 2, illustrating elements thereof in a second representative operating position.

Referring also to FIG. 6a, knife head assemblies 176 of drives 76 and 78 are again illustrated in the mid-stroke position. Pinion shaft 146 of drive 76 is disposed directly above (rearwardly of) central rotational axis 120 of that drive. Pinion shaft 146 of drive 78 is disposed directly below (forwardly of) central rotational axis 120 of that drive. Arm portions 180 of both drives are about midway along their extents of travel in contact with their respective rollers 182. FIG. 6b is a schematic representation of the position of pinion shaft 146 of drive 78 when in the position shown in FIGS. 6 and 6a. Pinion gear 152 is shown engaged with ring gear 150, which it should be remembered, is concentric with central rotational axis 120. Eccentric element 154 of that drive is also concentric with axis 120. In this position, as pinion shaft 146 is caused to orbit or circle in the clockwise direction about central rotational axis 120, as denoted by arrow D, resulting from the rotation of input element 116 by belt 112 (FIG. 6) as explained earlier, pinion shaft 146 will be caused to rotate in the counterclockwise direction about eccentric axis 136 therethrough, as denoted by arrow E, as a result of the engagement of pinion gear 152 with ring gear 150. This will result in eccentric element 154 also being rotated counterclockwise in direction E, to the position shown in FIG. 7b. This also illustrated in FIGS. 7 and 7a. As a result of the restraint of knife head assemblies 176 so as to be movable sidewardly only, and the presence of bearings 178, eccentric elements 154 are allowed to rotate relative to the respective assembly 176, with the further result that assemblies 176 are displaced sidewardly. Here, knife head assembly 176 of drive 76 is displaced or stroked sidewardly inwardly toward the right as denoted by arrow F in FIG. 7, while knife head assembly 176 of drive 78 is displaced or stroked sidewardly inwardly toward the left, as denoted by arrow G. This position illustrated in FIG. 7 represents the maximum inward extent of the cutting strokes of knife assemblies 60. Referring to FIGS. 6a and 7, movement in directions F and G (FIG. 7) results in generation of moments against rollers 182, as a result of knife assemblies 60 being located forward of sickle drive 66A and the considerable forces required for acceleration and deceleration of the long knife assemblies, and opposition generated by the cutting action and friction, which moment forces can reach thousands of pounds and will be contained within the structure of the drive.

Figure 8A:
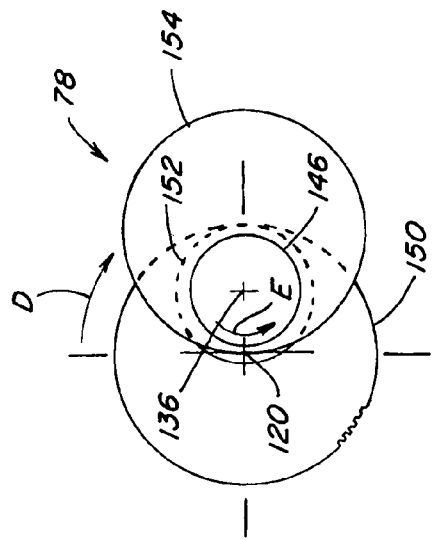
FIG. 8a is a simplified schematic top view of the pinion gear, ring gear and eccentric element of the drive mechanism of FIG. 8.
Figure 8:
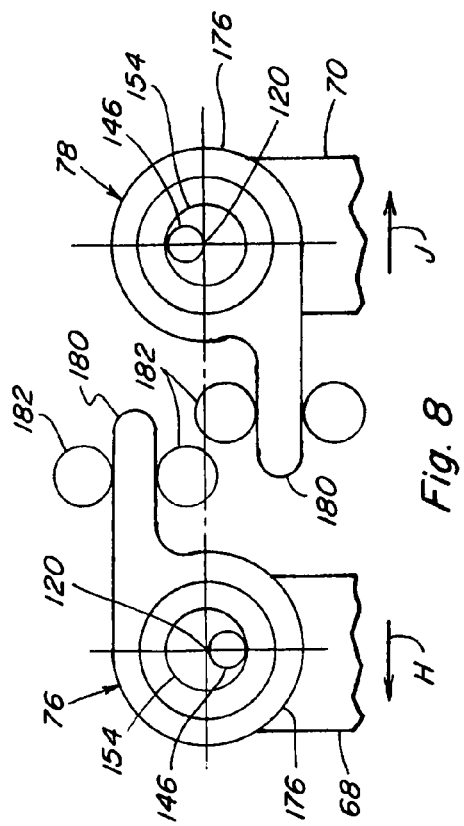
FIG. 8 is a simplified schematic top view of the drive mechanism of FIG. 2, illustrating elements thereof in a third representative operating position.

Referring also to FIGS. 8 and 8a, knife head assemblies 176 of drives 76 and 78 are again illustrated in the mid-stroke position, after continued movement of pinion shafts 146 in direction D about axis 120, as effected by continued rotation of input elements 116 in direction C (FIG. 6). This, in turn, effects a corresponding reversal of the sideward directions of movement of knife head driver elements 68 and 70 to a sideward outward direction (arrows H and J), from those shown in FIG. 7 (arrows F and G). Arm portions 180 of both drives are about midway along their extents of travel in contact with their respective rollers 182, such that the knife assemblies will be positioned as illustrated in FIG. 6. In FIG. 8b, pinion gear 152 of drive 78 has continued rotation in direction E about axis 136 around ring gear 150 and axis 120, and eccentric element 154 of that drive is also again concentric with axis 120. Again, eccentric elements 154 are allowed to rotate relative to the respective knife head assembly 176, with the result that assemblies 176 are displaced sidewardly only. During this direction of movement, moment forces are generated in the opposite directions against rollers 182 compared to those shown in FIG. 6a, as denoted in FIG. 8, which moments will be contained within the structure of the drive.

Figure 9B:
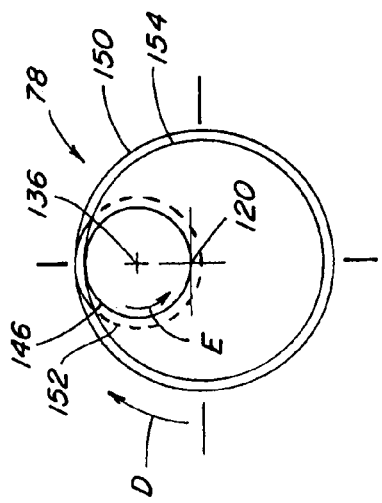
FIG. 9b is a simplified schematic top view of the pinion gear, ring gear and eccentric element of the drive mechanism of FIG. 9.
Figure 9A:
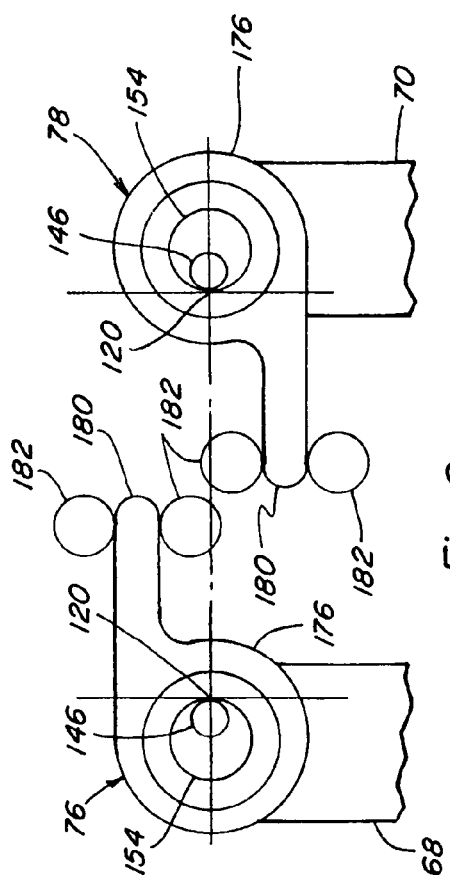
FIG. 9a is a simplified schematic top view of the pinion gear, ring gear and eccentric element of the drive mechanism of FIG. 9.
Figure 9:
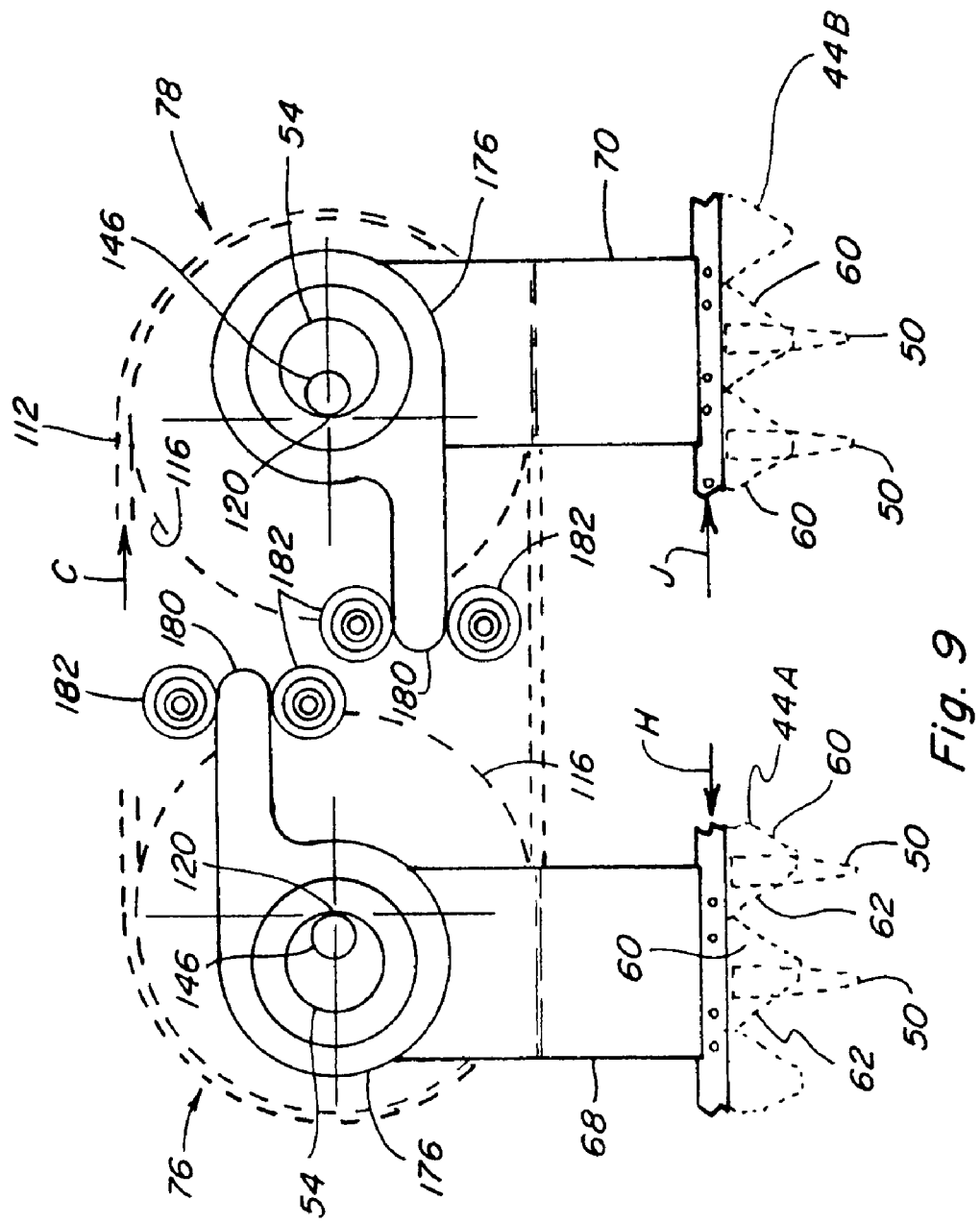
FIG. 9 is another top view of the drive mechanism of FIG. 2, illustrating elements thereof in another representative operating position.

Turning to FIGS. 9, 9a and 9b, knife head assemblies 176 of drives 76 and 78 are now illustrated moved further in the sideward outward directions H and J to their sideward outermost positions, as a result of further continued movement of pinion shafts 146 in direction D about axis 120, as effected by continued rotation of input elements 116 in direction C. Arm portions 180 of both drives are at their farthest outward extents of travel in contact with their respective rollers 182. Knife assemblies 60 are illustrated in about an outward end of their strokes after passage of the knife edges 62 through guards 50 in an outward cutting stroke. In FIG. 9b, pinion gear 152 of drive 78 has continued rotation in direction E about axis 136 around ring gear 150 and axis 120, and eccentric element 154 of that drive is shifted sidewardly outwardly of axis 120. Again, eccentric elements 154 are allowed to rotate relative to the respective assembly 176, with the result that assemblies 176 are displaced sidewardly only. With continued movement of pinion shafts 146 in direction D about axis 120, as effected by continued rotation of input elements 116 in direction C, the elements of drives 76 and 78 will return to the positions illustrated in FIG. 6, and thus completing a complete revolution of pinion shafts 146 about central rotational axes 120, which corresponds to a complete revolution of input elements 116 of the drives.

Here, as an advantage of the invention, it should be apparent that knife head assemblies 176 and driver elements 68 and 70 are moved by drives 76 and 78 in opposite sideward directions, such that sideward forces exerted respectively thereby are at least substantially canceled. Additionally, forces generated by eccentric movements of respective eccentric plates 158 will at least substantially cancel one another, as the eccentric movements are in opposite directions. Additionally, the structure of the drives is strong and robust, so as to be capable of containing forces resulting from the moments generated by the accelerations and decelerations of the knife assemblies, which can be substantial. As a result, vibrations and forces exerted by drive mechanisms 66A and 66B against supporting framework, such as frame 58 of header 22, will be minimal.

As an additional advantage, header 22 is intended to be representative of a variety of headers for plant cutting machines with which sickle drive mechanisms of the invention, represented by drives 66A and 66B, can be used. By using two sickle drive mechanisms, 66A and 66B at spaced locations across the width of the header, each mechanism driving two knife assemblies 60, each knife assembly need only have a length corresponding to one-fourth the width of the header. This reduces the mass of the knife assembly, compared to a knife assembly which extends along one-half the width of the header. For instance, for a header having a width of 30 feet, four knife assemblies each having width of 7.5 feet can be used. For a header having a width of 40 feet, four knife assemblies each having width of 10 feet can be used. As a result, the operating speeds of drive mechanisms 66A and 66B can be faster, for instance on an order of 1600 strokes per minute or more, and preferably within a range of about 1600 to about 2000 strokes per minute. This is advantageous, as it allows the combine to be operated at a faster ground speed than would be possible using a slower cutter speed.

Further, it should be noted that directional references herein, including forward, rearward, sideward, upward and downward, are for reference purposes only, and are not intended to limit the present invention to any particular orientation or in any way.

Figure 10:
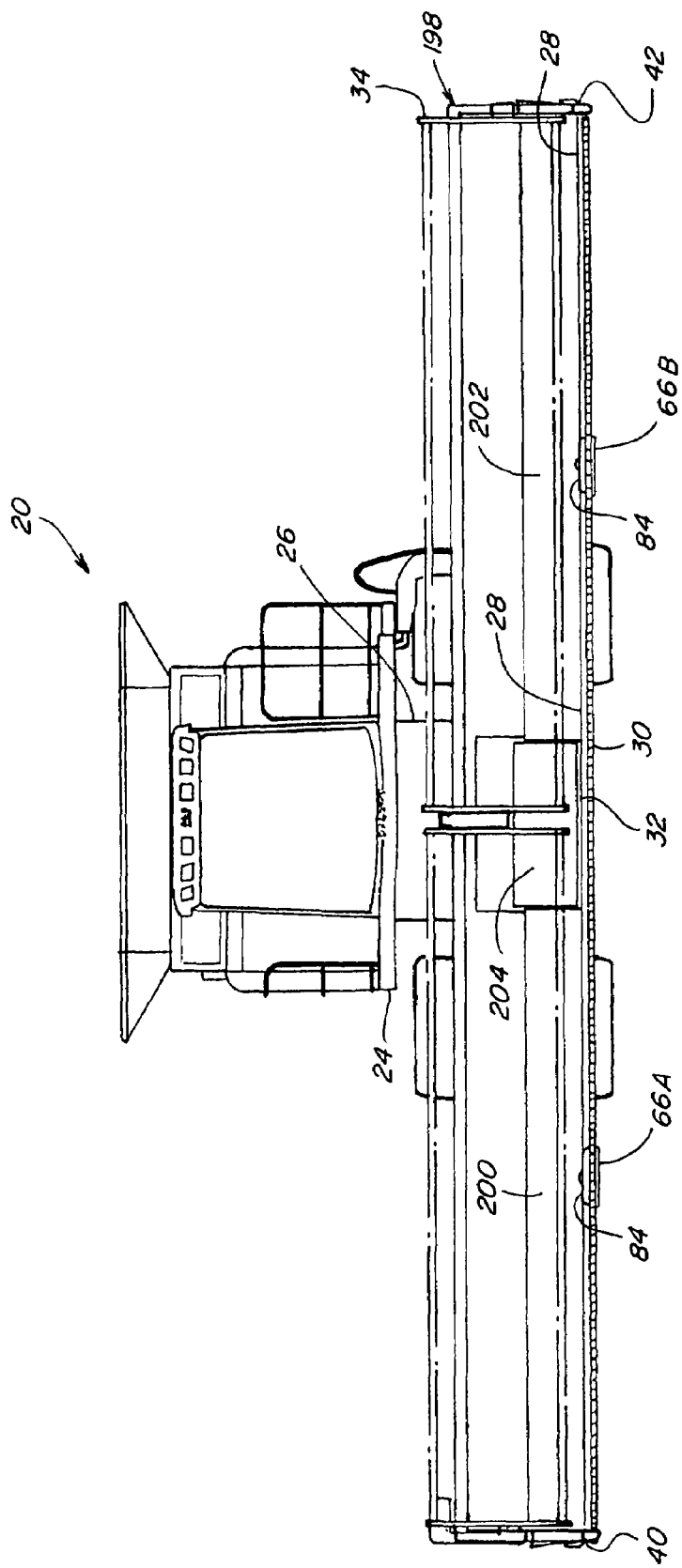
FIG. 10 is another front view of the combine of FIG. 1, including a different header which is a draper header incorporating sickle drives of the invention.
Figure 11:
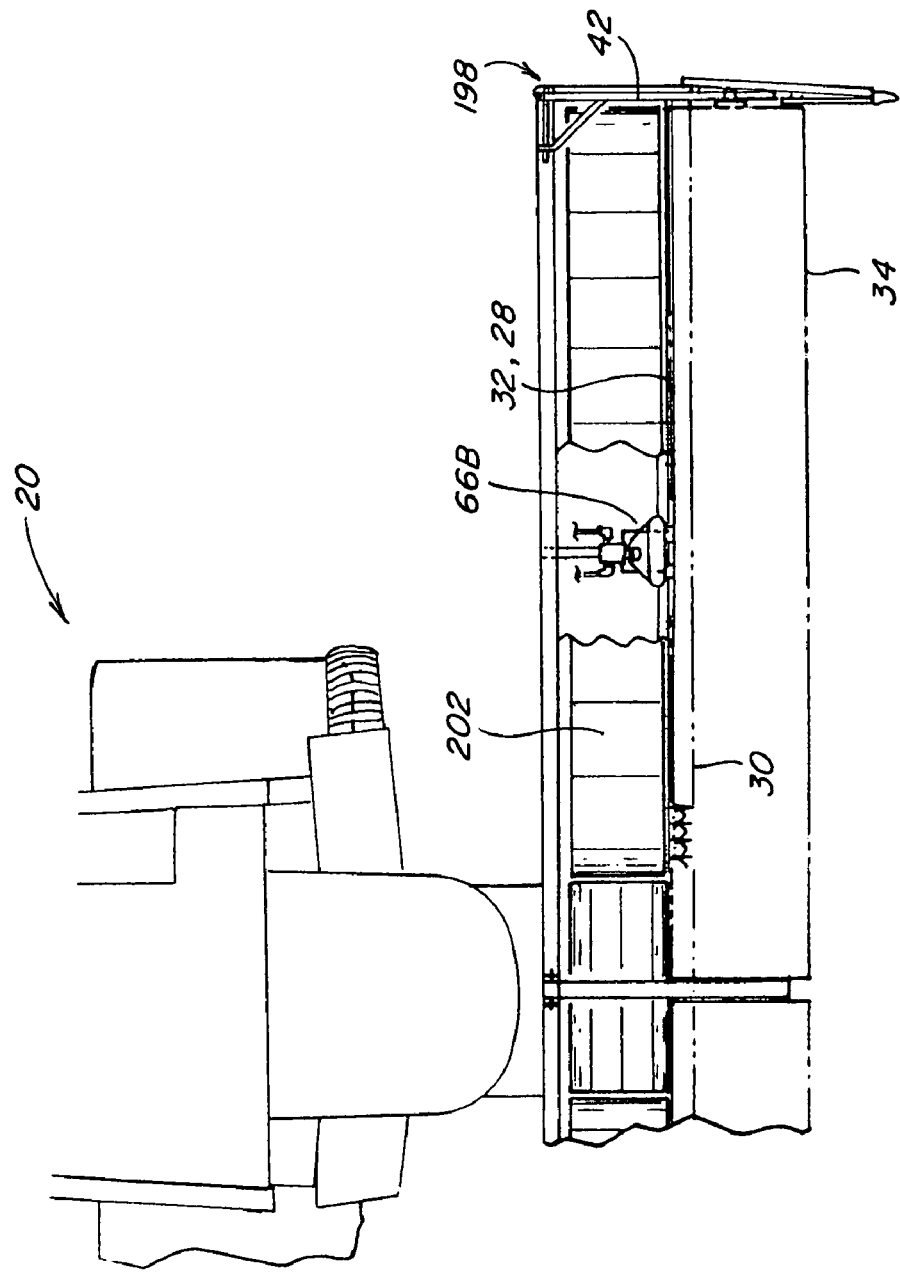
FIG. 11 is a fragmentary top view of the combine and draper header of FIG. 10, showing a portion of a draper belt thereof removed to reveal a sickle drive mechanism of the invention.

Still further, in FIGS. 10 and 11, combine 20 is shown including an alternative header 198 which is a representative draper type header, including sickle drive mechanisms 66A and 66B constructed and operable according to the teachings of the present invention, like parts of header 198 and header 22 being identified by like numerals. Draper header 198 includes a sickle 30 extending across a forward edge portion 32 of a floor 28, between first and second side edge portions 40 and 42 of the floor. Sickle 30 is composed of a first cutter bar assembly 44A in end to end relation with a second cutter bar assembly 44B, and a third cutter bar assembly 44C in end to end relation with a fourth cutter bar assembly 44D. A reel 34 is disposed above sickle 30. A pair of elongate draper belts 200 and 202 extended sidewardly along and form a portion of floor 28, and are movable toward the center of the header for conveying cut crops through a crop conveying area to a center belt 204 operable for conveying the crop rearwardly into a mouth or inlet opening of a feeder 26 of combine 20. Sickle drive mechanisms 66A and 66B of header 198 are constructed and operable in the above-described manner, and provide all of the features and advantages of sickle drive mechanisms 66A and 66B of header 22. Here, in FIG. 10, it can be observed that upper cover 84 of compact sickle drives 66A and 66B are streamlined and has a low profile so as to be substantially unobtrusive to crop flow over floor 28.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A header for an agricultural plant cutting machine, comprising:

a floor having spaced apart first and second opposite side edge portions, an elongate forward edge portion extending between the side edge portions, and an upwardly facing surface extending between the side and forward edge portions defining a cut plant material flow area thereabove;

an elongate first knife assembly including a linear array of knives, the first knife assembly being supported so as to extend longitudinally adjacent to a first portion of the forward edge portion of the floor and so as to be movable longitudinally sidewardly relative thereto for severing plants from a field as the header is moved forwardly thereover;

a first epicyclic drive supported and disposed below the upwardly facing surface of the floor at a first location between the first and second side edge portions thereof, the first epicyclic drive being connected in driving relation to the first knife assembly and operable for reciprocatingly moving the first knife assembly longitudinally sidewardly relative to the forward edge portion of the floor;

a second knife assembly supported along a second portion of the elongate forward edge portion of the floor in generally end to end relation to the first knife assembly, so as to be longitudinally movable sidewardly relative to the forward edge portion for severing plants from a field as the header is moved forwardly thereover;

a second epicyclic drive supported and disposed below the upwardly facing surface of the floor at the first location between the first and second edge portions and connected in driving relation to the second knife assembly and operable for reciprocatingly moving the second knife assembly longitudinally sidewardly relative to the forward edge portion of the floor;

third and fourth knife assemblies supported in generally end to end relation along third and fourth portions of the elongate forward edge portion of the floor, respectively, for longitudinal movement sidewardly relative thereto for severing plants from a field as the header is moved forwardly thereover; and third and fourth epicyclic drives supported and disposed below the upwardly facing surface of the floor at a second location between the first and second side edge portions thereof and connected in driving relation to the third and fourth knife assemblies, respectively, and operable for reciprocatingly drivingly moving the third and fourth knife assemblies longitudinally sidewardly relative to the forward edge portion of the floor, wherein the epicyclic drives are configured to at least substantially cancel sideward forces generated by the reciprocating movements of the knife assemblies.

2. The header of claim 1, wherein the first epicyclic drive and the second epicyclic drive are contained in a single housing beneath the upwardly facing surface of the floor, and wherein the third epicyclic drive and the fourth epicyclic drive are contained in another housing beneath the upwardly facing surface of the floor.

3. The header of claim 1, wherein the first edge portion, the second edge portion, the third edge portion, and the fourth edge portion have about equal lengths and extend in end to end relation between the side edge portions of the floor, the first location is disposed between the first and the second edge portions, and the second location is disposed between the third and the fourth edge portions.

4. The header of claim 1, wherein the first epicyclic drive and the second epicyclic drive are connected in driven relation to a common power source, and the third epicyclic drive and the fourth epicyclic drive are connected in driven relation to a second common power source.

5. The header of claim 4, wherein the first epicyclic drive and the second epicyclic drive are connected in driven relation to the common power source by a drive belt, and the third epicyclic drive and the fourth epicyclic drive are connected in driven relation to the second common power source by a second drive belt.

6. The header of claim 1, wherein each of the epicyclic drives comprises:
an input element supported beneath the floor for rotation about a central rotational axis through the input element;
a pinion gear supported in connection with the input element for rotation relative thereto about an eccentric axis offset from and parallel to the central rotational axis;
a fixed ring gear concentric with the input element and enmeshed with the pinion gear such that rotation of the input element about the central rotational axis will cause the pinion gear to rotate around the ring gear about the central rotational axis and simultaneously rotate about the eccentric axis;
an eccentric element fixedly connected to the pinion gear so as to be rotated thereby about the ring gear and the central rotational axis when the input element is rotated; and
a knife head driver element supported for sideward movement along the forward edge portion of the floor, the knife head driver element being rotatably connected to the eccentric element and configured so as to transfer sidewardly directed components of rotations of the eccentric element into sideward reciprocating movements.

7. The header of claim 1, wherein the first epicyclic drive and the second epicyclic drive are driven in timed relation one to the other such that the sideward forces generated by the reciprocating movements of the first knife assembly and the second knife assembly will at least substantially cancel, and wherein the third epicyclic drive and the fourth epicyclic drive are driven in timed relation one to the other such that the sideward forces generated by the reciprocating movements of the third knife assembly and the fourth knife assembly will at least substantially cancel.

8. The header of claim 1, wherein the upwardly facing surface of the floor comprises at least one belt movable for conveying cut plant material through the plant flow area, and the drives are located forwardly of and below the belt.

9. The header of claim 1, wherein each of the epicyclic drives is operable for reciprocatingly moving the knife assembly connected thereto at a speed of between about 1600 and 2000 strokes per minute.

10. The header of claim 1, wherein each of the knife assemblies has a length of from about 7 feet to about 12 feet.

11. A header for an agricultural harvesting machine, comprising:
an elongate structure having a first end portion, a second end portion opposite the first end portion, an elongate forward edge portion extending between the first and second end portions, and an at least generally upwardly facing floor extending along the elongate forward edge portion between the first and second end portions;
an elongate first knife assembly supported by the structure adjacent to a first portion of the forward edge portion thereof for longitudinal movement therealong;
an elongate second knife assembly supported by the structure adjacent to a second portion of the forward edge portion thereof for longitudinal movement therealong in generally end to end relation to the first knife assembly;
a first sickle drive mechanism supported on the structure and including a first epicyclic drive connected in driving relation to the first knife assembly and operable for reciprocatingly moving the first knife assembly relative to and along the first forward edge portion of the structure, and a second epicyclic drive connected in driving relation to the second knife assembly and operable for reciprocatingly moving the second knife assembly relative to and along the second forward edge portion of the structure, the sickle drive mechanism being disposed at least partially beneath a portion of the floor spaced from the first and second end portions of the structure;
an elongate third knife assembly supported by the structure adjacent to a third portion of the forward edge portion thereof for longitudinal movement therealong;
an elongate fourth knife assembly supported by the structure adjacent to a fourth portion of the forward edge portion thereof for longitudinal movement therealong in generally end to end relation to the third knife assembly; and
a second sickle drive mechanism supported on the structure and including a third epicyclic drive connected in driving relation to the third knife assembly and operable for reciprocatingly moving the third knife assembly relative to and along the third forward edge portion of the structure, and fourth epicyclic drive connected in driving relation to the fourth knife assembly and operable for reciprocatingly moving the fourth knife assembly relative to and along the fourth forward edge portion of the structure, the second sickle drive mechanism being disposed at least partially beneath a portion of the floor spaced from the first and second and portions of the structure, wherein the epicyclic drives are configured to at least substantially cancel sideward forces generated by the reciprocating movements of the knife assemblies.

12. The header of claim 11, wherein the first and the second epicyclic drives are jointly driven, and the third and the fourth epicyclic drives are jointly driven.

13. The header of claim 11, wherein the first and the second epicyclic drives are supported in side by side relation on a portion of the structure disposed beneath the floor, and the third and the fourth epicyclic drives are supported in side by side relation on another portion of the structure disposed beneath the floor.

14. The header of claim 13, wherein the knife assemblies and the sickle drive mechanisms are supported on the portion of the structure disposed beneath the floor, for vertical movement relative to the floor.

15. The header of claim 11, wherein the floor of the header includes at least one belt movable for conveying cut plant material thereover and the sickle drive mechanisms are supported on the structure generally forwardly of the belt.

16. The header of claim 11, wherein the first and the second epicyclic drives are timed so as to reciprocatingly move the first and second knife assemblies, respectively, in opposite directions toward the end portions of the structure, such that at least a substantial portion of any forces directed toward the end portions generated by the reciprocating movements of the first and the second knife assemblies cancel one another, and wherein the third and the fourth epicyclic drives are timed so as to reciprocatingly move the third and the fourth knife assemblies, respectively, in opposite directions toward the end portions of the structure, such that at least a substantial portion of any forces directed toward the end portions generated by the reciprocating movements of the third and the fourth knife assemblies cancel one another.

17. The header of claim 16, wherein the first and the second epicyclic drives are jointly supported on a single housing such that the forces generated thereby will cancel one another at least substantially within the housing, and wherein the third and the fourth epicyclic drives are jointly supported on a second housing such that the forces generated thereby will cancel one another at least substantially within the second housing.

18. The header of claim 11, wherein each of the epicyclic drives is operable for reciprocatingly moving the knife assembly connected thereto at a speed of at least 1600 strokes per minute.

19. The header of claim 11, wherein each of the knife assemblies has a length of from about 7 feet to about 12 feet.

20. A header for an agricultural harvesting machine, comprising:

an elongate structure having a first end portion, a second end portion opposite the first end portion, an elongate forward edge portion extending between the first and second end portions, and an at least generally upwardly facing floor extending along the elongate forward edge portion between the first and second end portions;

an elongate first knife assembly having a length of from about 7 feet to about 12 feet, supported by the structure adjacent to a first portion of the forward edge portion thereof for longitudinal movement therealong;

an elongate second knife assembly having a length of from about 7 feet to about 12 feet, supported by the structure adjacent to a second portion of the forward edge portion thereof for longitudinal movement therealong in generally end to end relation to the first knife assembly;

a first sickle drive mechanism supported on the structure and including a first epicyclic drive connected in driving relation to the first knife assembly and operable for reciprocatingly moving the first knife assembly relative to and along the first forward edge portion of the structure, and a second epicyclic drive connected in driving relation to the second knife assembly and operable for reciprocatingly moving the second knife assembly relative to and along the second forward edge portion of the structure, the first sickle drive mechanism being disposed at least partially beneath a portion of the floor spaced from the first and second end portions of the structure;

an elongate third knife assembly having a length of from about 7 feet to about 12 feet, supported by the structure adjacent to a third portion of the forward edge portion thereof for longitudinal movement therealong;

an elongate fourth knife assembly having a length of from about 7 feet to about 12 feet, supported by the structure adjacent to a fourth portion of the forward edge portion thereof for longitudinal movement therealong in generally end to end relation to the third knife assembly; and a second sickle drive mechanism supported on the structure and including a third epicyclic drive connected in driving relation to the third knife assembly and operable for reciprocatingly moving the third knife assembly relative to and along the third forward edge portion of the structure, and fourth epicyclic drive connected in driving relation to the fourth knife assembly and operable for reciprocatingly moving the fourth knife assembly relative to and along the fourth forward edge portion of the structure, the second sickle drive mechanism being disposed at least partially beneath a portion of the floor spaced from the first and second and portions of the structure, wherein the epicyclic drives are configured to at least substantially cancel sideward forces generated by the reciprocating movements of the knife assemblies.

21. The header of claim 20, wherein each of the epicyclic drives is operable for reciprocatingly moving the knife assembly connected thereto at a speed of at least 1600 strokes per minute.

22. The header of claim 20, wherein the first and the second epicyclic drives are jointly supported on a single housing such that the forces generated thereby will cancel one another at least substantially within the housing, and wherein the third and the fourth epicyclic drives are jointly supported on a second housing such that the forces generated thereby will cancel one another at least substantially within the second housing.

* * * * *